Patented Apr. 9, 1935

1,996,755

UNITED STATES PATENT OFFICE 1,996,755

MANUFACTURE OF ALIPHATIC COMPOUNDS

Henry Dreyfus, London, England

No Drawing. Application May 25, 1929, Serial
No. 366,095. In Great Britain June 7, 1928

12 Claims. (Cl. 260—123)

This invention relates to the manufacture of aliphatic anhydrides from aliphatic acids and especially to the manufacture of acetic anhydride from acetic acid.

It is known that aliphatic anhydrides can be prepared by subjecting vapors of aliphatic acids to thermal decomposition and various catalysts have been proposed for the reaction.

In my researches I have found that certain substituted aliphatic acids, namely alkacyl (i. e. aliphatic acidyl) derivatives of inorganic acids, are highly useful catalysts for the reaction.

According to the invention, therefore, I produce aliphatic anhydrides (and especially acetic anhydride) by subjecting the vapors of aliphatic acids (especially acetic acid) to thermal decomposition in presence of one or more substituted aliphatic acids, for example bodies of the formula

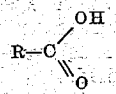

wherein R is an alkyl group containing at least one sulphonic acid or halogen substituent.

In performing the invention I preferably employ as the said substituted aliphatic acids, one or more of the following:—mono or poly chloracetic acids, mono or poly bromacetic acids, mono or poly chlor (or brom) propionic acids, or sulphacetic acid, $SO_2OH-CH_2.COOH$, though it is to be understood that I in no wise limit myself to the use of these particular bodies.

The reaction may be performed at temperatures of from about 250° to 1000° C. and preferably at temperatures of from about 300° to 700° C.

The process of the invention may be performed in any convenient manner. For instance, a mixture of acetic or other aliphatic acid and one or more of the said substituted aliphatic acids may be passed in vapor form in a rapid stream through tubes or other form of reaction zone heated to the desired temperature. Such tubes or other form of reaction zone may be made from or lined with copper, silica, earthenware, fireclay or other suitable material and may, if desired, be filled with or otherwise contain balls or pieces of pumice, kieselguhr, "Carborundum" or other filling materials. Further, if desired, the reaction zone may contain catalysts hitherto known to promote the scission of aliphatic acids into their anhydrides.

The mixture of the aliphatic acids and the said substituted aliphatic acids may be made in any suitable way. Conveniently they may be prepared by simple admixture in the vapor form or by passing vapors of the aliphatic acid in a regulated stream through the hot or boiling substituted aliphatic acids. In performing the reaction I preferably employ mixtures containing about 1% to 10% of the substituted aliphatic acid or acids, though I in no wise limit myself in this respect.

Instead of first mixing the substituted aliphatic acid or acids with the aliphatic acid vapor I may, for instance, inject the substituted aliphatic acid or acids (in liquid or vapor form) directly into the heated reaction zone through which the aliphatic acid vapor is caused to pass in a rapid stream.

It is to be understood that the invention is not limited as to the pressure employed, as the process of the invention may be performed under ordinary atmospheric pressure, or under reduced pressure or "vacuum" or under higher pressures than atmospheric, for instance, under pressures of from 3 to 10 atmospheres or more.

The anhydride produced by the process may be separated from the reaction gases or vapors in any suitable way. The anhydride separated or recovered from the reaction gases or vapors may if desired or required be purified by any suitable means. For instance, it may be distilled from an anhydrous acetate (e. g. anhydrous sodium acetate).

In the recovery or separation of the anhydride from reaction vapors the reaction gases or vapors are preferably not submitted to simple condensation as such condensation involves hydrolysis and consequent loss of anhydride, but they are preferably treated to separate the anhydride from the water vapor present or formed in the reaction. For instance, the gases or vapors from the reaction zone may be subjected to fractional condensation, for example, by leading them up through one or more fractionating columns maintained at a temperature or temperatures intermediate between the boiling points (under the conditions of pressure obtaining) of the anhydride and of water, whereby the anhydride is condensed and the water passes on in vapor form.

Or, for instance, the reaction gases or vapors may be passed through one or more solvents for the anhydride which are insoluble in water and which have higher boiling points than water (preferably of higher boiling point than the anhydride), such solvents being employed at temperatures intermediate between the boiling points (under the conditions of pressure obtaining) of water and of the anhydride, whereby the anhydride is condensed or absorbed and the water escapes in vapor form. As examples of such solvents may be mentioned chlorbenzene, paradichlorbenzene, benzyl ether, tetrachlorethane, paraffin oil, triacetin, phenetol, anisol, one or more cresols, and paracresyl acetate.

Or, for instance, the reaction gases or vapors may be subjected to condensation by the process described and claimed in U. S. application S. No. 284,566 filed 11th June 1928, that is to say the anhydride may be condensed from the reaction vapors whilst carrying away the water vapor by the vapor of one or more "entraining" liquids. In such form of execution the reaction vapors are preferably mixed after leaving the reaction zone with the vapors of the entraining liquid or liquids at a temperature below the boiling point (under the conditions of pressure obtaining) of the anhydride. Conveniently such mixing may be performed by introducing the reaction vapors (which should not be allowed to cool below the boiling point of water before becoming mixed with the vapors of the entraining liquid or liquids) into a vessel up which the vapors of the entraining liquid or liquids are caused to rise; by this means the anhydride may be substantially condensed and the water vapor carried away with the vapors of the entraining liquid or liquids. Examples of entraining liquids which I may use for such method of condensation are, benzene, carbon tetrachloride, petrol, mixtures of two or more of such bodies, or mixtures of ether with petroleum ether; it will be understood, however that any other liquids chemically inert to the anhydride and having a high entraining capacity for water may be employed. The liquids should preferably have a low entraining capacity for the anhydride. Toluol, xylenes or other "entraining" liquids whose boiling points are intermediate between those of water and of the anhydride, are especially suitable for this method of separation.

Or again, for instance, the reaction gases or vapors may be subjected to condensation by the process described and claimed in Patent No. 1,931,687, that is to say they may be subjected to condensation by leading them under the surface of an "extracting" liquid cooled down or otherwise kept at temperatures below (and preferably considerably below) the boiling point of water. By the term "extracting" liquid is meant a liquid or liquid mixture in which the anhydride is soluble and which is chemicall inert to the anhydride and insoluble or substantially insoluble in water. As examples of such "extracting" liquids may be mentioned benzene, chloroform and mixtures of ethyl ether or chloroform with one or more hydrocarbons such as light paraffins, gasoline, kerosene, benzol or its homologues. It is preferable to use as "extracting" liquids, liquids of the character referred to which are themselves hydrocarbons or which contain hydrocarbons, for example, benzene or mixtures of ethyl ether or chloroform with one or more hydrocarbons such as paraffins (particularly the petroleum fraction of boiling point 40° to 70° C. termed petroleum ether), gasoline (boiling point 70° to 90° C.), kerosene, benzol or its homologues. The following particular examples of "extracting" liquids are very suitable:—ether in admixture with petroleum ether, chloroform mixed with petroleum ether and/or gasoline; and mixtures of ether and petroleum ether containing about 30 to 50% petroleum ether containing about 30 to 50% petroleum ether are especially suitable.

Or again, for instance, the reaction vapors may be treated by the process described and claimed in U. S. application S. No. 242,977 filed 27th December 1927, that is to say they may be passed over or otherwise in contact with one or more "water binding" substances maintained at a temperature or temperatures below (and preferably substantially below) the temperature at which the reaction vapors are produced. By such treatment the water vapor may be substantially absorbed from the reaction vapors. In such treatment the water binding substances are preferably maintained at temperatures above the boiling point (under the conditions of pressure obtaining) of water to avoid condensation of water and resulting risk of loss of anhydride through hydrolysis, and for the best functioning of the treatment the water binding substances should be employed at temperatures above the boiling point of the anhydride in which case the water can be substantially absorbed and the anhydride pass on in vapor form. The term "water binding" substances means bisulphates, pyrosulphates (especially bisulphates and pyrosulphates of the alkali and earth alkali metals), zinc chloride, calcium chloride, orthophosphoric acid, pyrophosphoric acid, metaphosphoric acid and like substances which have affinity (and preferably high affinity) for water but excluding substances having a deleterious effect on aliphatic acids or anhydrides, such as sulphuric acid.

Or again, for instance, the reaction vapors may be subjected to condensation by the process described and claimed in Patent No. 1,915,573, that is to say they may be caused to impinge upon a flowing stream of benzene (or other water insoluble solvent for the anhydride) whereby the gases or vapors are quickly cooled and condensed and the anhydride separated from the water. The benzene (or other solvent) so employed may be collected and the water layer (usually the lower layer) which separates out may be removed and the benzene (or equivalent) layer distilled to recover the anhydride.

In cases where the thermal decomposition of the aliphatic acid vapor is performed under pressures higher than atmospheric it is preferable, prior to subjecting the reaction gases or vapors to treatment for recovery or separation of the anhydride, to pass the reaction gases or vapors through one or more reducing valves or like apparatus in order to reduce the pressure substantially to atmospheric.

It is to be understood that the invention is not limited as to the strength of aliphatic acid employed. The process can be performed even with the vapors of dilute acids; and besides affording a ready means for the manufacture of anhydrides from concentrated or highly concentrated acids, it affords valuable means for producing anhydrides from waste or dilute acids, especially waste or dilute acids such as result from the acetylation of cellulose or other industrial acetylation processes.

The following examples serves to illustrate a convenient form of execution of the invention, it being understood that it is only given by way of example and is in no way limitative.

Example

A mixture of the vapors of acetic acid and chloracetic acid, containing between 5% and 7% of chloracetic acid, is passed in a rapid stream through an earthenware tube heated to a temperature between 450° and 600° C. the tube being filled with balls or pieces of pumice or kieselguhr. The vapors resulting from the reaction are caused to pass upwards through one or more fractionating columns maintained at a temperature or temperatures intermediate between the boiling points of acetic anhydride and water, whereby the anhydride is substantially condensed and the water allowed to pass on in vapor form.

What I claim and desire to secure by Letters Patent is:—

1. Process for the manufacture of an aliphatic anhydride, which comprises thermally decomposing the vapor of an aliphatic acid in presence of at least one body of the formula

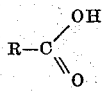

wherein R is an alkyl group containing at least one sulphonic acid or halogen substituent.

2. Process for the manufacture of an aliphatic anhydride, which comprises thermally decomposing the vapor of an aliphatic acid in presence of a chloracetic acid.

3. Process for the manufacture of an aliphatic anhydride, which comprises thermally decomposing the vapor of an aliphatic acid in presence of sulphacetic acid.

4. Process for the manufacture of an aliphatic anhydride, which comprises subjecting the vapor of an aliphatic acid in presence of at least one body of the formula

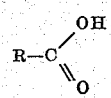

wherein R is an alkyl group containing at least one sulphonic acid or halogen substituent, to thermal decomposition at a temperature between 250 and 1000° C.

5. Process for the manufacture of an aliphatic anhydride which comprises subjecting the vapor of an aliphatic acid in presence of at least one body of the formula

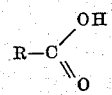

wherein R is an alkyl group containing at least one sulphonic acid or halogen substituent, to thermal decomposition at a temperature between 300 and 700° C.

6. Process for the manufacture of an aliphatic anhydride, which comprises subjecting a vaporous mixture of an aliphatic acid and a body of the formula

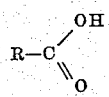

wherein R is an alkyl group containing at least one sulphonic acid or halogen substituent containing between 1% and 10% of this body to thermal decomposition.

7. Process for the manufacture of acetic anhydride which comprises thermally decomposing acetic acid vapor in presence of at least one body of the formula

wherein R is an alkyl group containing at least one sulphonic acid or halogen substituent.

8. Process for the manufacture of acetic anhydride which comprises thermally decomposing the vapor of acetic acid in presence of a chloracetic acid.

9. Process for the manufacture of acetic anhydride which comprises thermally decomposing the vapor of acetic acid in presence of a sulphacetic acid.

10. Process for the manufacture of acetic anhydride which comprises subjecting the vapor of acetic acid in presence of at least one body of the formula

wherein R is an alkyl group containing at least one sulphonic acid or halogen substituent, to thermal decomposition at a temperature between 250 and 1000° C.

11. Process for the manufacture of acetic anhydride, which comprises subjecting the vapor of acetic acid in presence of at least one body of the formula

wherein R is an alkyl group containing at least one sulphonic acid or halogen substituent, to thermal decomposition at a temperature between 300 and 700° C.

12. Process for the manufacture of acetic anhydride, which comprises subjecting a vaporous mixture of acetic acid and a body of the formula

wherein R is an alkyl group containing at least one sulphonic acid or halogen substituent containing between 1% and 10% of this body, to thermal decomposition.

HENRY DREYFUS.